United States Patent Office 3,464,848
Patented Sept. 2, 1969

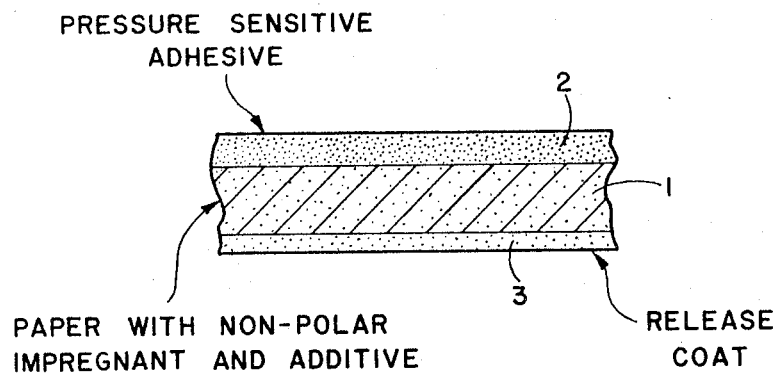

3,464,848
PRESSURE SENSITIVE TAPE HAVING
IMPROVED BACKING
John F. Hechtman and Stephan R. Bornslaeger, Munising, Mich., assignors to Kimberly-Clark Corporation, Neenah, Wis., a corporation of Delaware
Filed Apr. 11, 1966, Ser. No. 541,768
Int. Cl. C09j 7/00
U.S. Cl. 117—122                                    2 Claims

ABSTRACT OF THE DISCLOSURE

A pressure sensitive tape having an impregnated fibrous base sheet in which the strengthening impregnant of the base sheet is a styrene butadiene polymer. The sheet carries on one face an adhesive coat and on the second face a release coat. The impregnant of the base sheet includes a solubilizing agent capable of migration from the strengthening impregnant to the adhesive coating to serve the purpose of improving the adhesive life of the adhesive coating.

---

This invention relates to pressure sensitive tapes.

Pressure sensitive tapes are well known to the art. They commonly include an impregnated fibrous base sheet, an adhesive coating on one side of the base sheet and a release coating on the second side of the base sheet. The impregnated base sheet serves the purpose of providing strength to the composite. The release coating serves the purpose of preventing blocking of the adhesive to the impregnated base sheet when the composite is wound in roll form. The adhesive coat serves the purpose of attaching to objects to which the pressure sensitive tape is applied and for this purpose is required to develop a considerable tack under the application of pressure; it therefore includes an adhesive component as well as a tackifying agent.

While such pressure sensitive tapes have long been known and while styrene-butadiene polymers, for example, have been employed as a base sheet impregnant with other polymers, utilization of a styrene-butadiene impregnant alone in the base sheet has heretofore not been successfully achieved. Styrene-butadiene is desirable as a sole strengthening impregnant of the base sheet because it has many admirable properties for the purpose and is relatively inexpensive. However, the use of styrene-butadiene polymers as the impregnant has not been successfully achieved because of a considerable tendency of the pressure sensitive composite to lose adhesive capacity over a period of time.

It is a purpose of this invention to provide a pressure sensitive tape in which the sole strengthening impregnant of the base sheet is a styrene-butadiene polymer. This polymer may be simply styrene-butadiene without modification of the polymer chain or preferably the styrene-butadiene may be modified in known manner as by the inclusion, for example, of functional groups such as carboxyl and amides. Such polymers as these, we have found, have a capacity for solubilizing the tackifiers commonly employed in the adhesive portion of the pressure sensitive tapes. This leads, insofar as we have been able to determine, to the loss of tackiness when the styrene-butadienes are attempted to be employed as the impregnant.

We have found that excellent tapes may be made employing the noted styrene-butadienes as the only strengthening impregnant of the base sheet by incorporating into the base sheet certain classes of additive agents termed herein solubilizing agents. These agents have a capacity for solubilizing the adhesive and also of migrating from the styrene-butadiene polymer to the adhesive to effect the solubilizing. Additionally, where a release coat is employed on the back side of the composite, the release coat, since it necessarily is incompatible with the adhesive, is also incompatible with the solubilizing agent and the release coat is unaffected by the solubilizing agent in the impregnated base sheet.

The invention will be more fully understood by reference to the accompanying drawing and the following detailed examples.

In the drawing the numeral 1 designates a base sheet having an impregnant of a styrene-butadiene polymer and an additive agent which is a feature of this invention. The numeral 2 designates an adhesive coat on the base sheet, the coat itself being described more particularly hereinafter in connection with the specific examples. However, it is to be noted that any usual adhesive employed in pressure sensitive tapes may be employed herein.

The numeral 3 designates a usual release coating on the base sheet. This release coating is conventional and may be formed, for example, in accordance with United States Patent 3,066,043.

EXAMPLE 1

This example is illustrative of results obtained when styrene-butadiene impregnant is employed in the base sheet without a solubilizing agent and carries an adhesive coat and release coat in the manner already broadly described.

An adhesive is made up of the following components in parts by weight:

Adhesive coat

| | Parts by weight (dry) |
|---|---|
| Natural rubber | 100 |
| Zinc oxide | 30 |
| Tackifier (pentaerythritol ester of hydrogenated rosin) | 100 |
| Anti-oxidant (2,5′ ditertiary amyl hydroquinone) | 2 |
| Curing agent (zinc dibutyl dithiocarbonate) | ½ |

This adhesive composition is in and of itself conventional. This adhesive is preferably made up in solution form at a solids content of about 35% with hexane serving as the solvent. Application may be in aqueous emulsion form if so desired. These adhesive coats for pressure sensitive purposes commonly employ natural rubber as the adhesive component. Usually the tackifier is present to the extent of about 50 parts to 200 parts by weight based on 100 parts by weight of the adhesive component.

A release coating composition is made up in accordance with the directions in United States Patent 3,066,043, reference having been made to this patent hereinbefore.

Release coat

| | Parts by weight (dry) |
|---|---|
| Polyvinyl chloride | 60 |
| Copolymer of 85% ethyl acrylate, 10% methyl methacrylate, 5% acrylic acid | 40 |
| Titanium dioxide | 20 |
| Total solids, percent | 52 |
| Viscosity centipoises | 85 |

Acetic acid to pH 6.7.

This composition also is suitably applied in aqueous emulsion form.

The base sheet for impregnation is suitably a porous absorbent fibrous web of 100% bleached kraft spruce fibers having a basis weight of about 13 pounds per ream (17″ x 22″ x 500 sheet).

The impregnant or saturant has the following formulation:

Impregnant

| | Parts by weight (dry) |
|---|---|
| Styrene-butadiene (26% styrene, 74% butadiene) | 100 |
| Anti-oxidant (2,5' ditertiary amyl hydroquinone) | 0.5 |
| Anti-oxidant (2,2' methylenebis(4 methyl-6-tert-butyl-phenol) | 1.5 |
| Chelating agent (N-hydroxyethyl-ethylene-diamine-triacetic acid) | 0.5 |

This composition is made up to a solids content of about 40% by weight in aqueous emulsion form.

Initially, the base sheet is saturated with the impregnant composition to a pickup of about 80 parts of impregnant per 100 parts of fibers on a dry basis. Such saturation practice is conventional and may be carried out as described in United States Patents 3,026,217 and 3,026,241.

To the dry, impregnated base sheet the release coat is applied in accordance with the directions in United States Patent 3,066,043. Specifically, the release coat is preferably applied by an air knife coater and dried. To the base sheet on the opposite side thereof the adhesive coat composition is then applied. The adhesive coat is applied to the extent of about 10 pounds per ream (17" x 22" x 500 sheets) dry basis. The sheet is dried in any convenient manner, as in a tunnel dryer, to eliminate the solvent and to cure the coating.

This sheet is now pressure sensitive and it is applied to a release liner with the adhesive in contact with the liner. Aging takes place in the liner; samples are then applied to stainless steel panels with the adhesive in contact with the panel. After being rolled on the panel to assure of good adhesion, the force necessary to strip the samples, aged for various times at controlled temperatures, is measured. The force measurement is made in conventional manner on an Instron test machine at the rate of 12" per minute.

For the samples the following data were found.

| Days aged | Temperature (° F.) | Force measurement |
|---|---|---|
| 3 | 120 | 28.5 |
| 7 | 120 | 17.4 |
| 14 | 120 | 17.1 |
| 31 | 73 | 23.4 |

As is apparent, the adhesive capacity fell off rapidly with aging at moderate temperatures.

EXAMPLE 2

The above test was repeated substituting for the styrene-butadiene polymer a carboxy modified styrene-butadiene. Such carboxy modified polymers are known as impregnants. They adhere more specifically to the cellulose fibers than do the unmodified styrene-butadienes. The test data in this instance showed as follows:

| Days aged | Temperature (° F.) | Force measurement |
|---|---|---|
| 3 | 120 | 31.6 |
| 7 | 120 | 26.5 |
| 14 | 120 | 20.5 |
| 31 | 73 | 26.6 |

Again the drop in adhesive capacity on aging was very noticeable.

EXAMPLE 3

Example 2 was repeated and aging tests were conducted at 140° F. Also, Example 2 was repeated as Examples 3A and 3B except that solubilizers for the adhesive were added as follows to the impregnant composition.

EXAMPLE 3A 35 parts by weight (based on the dry weight of the styrene-butadiene) of a glycerol ester of partially hydrogenated rosin having a softening point of 80–88° C. C. This solubilizer for application was emulsified with the impregnant.

EXAMPLE 3B 35 parts by weight (based on the dry weight of the styrene-butadiene) of a glycerol ester of partially hydrogenated rosin having a softening point of 80–88° C.

The results of the aging tests are given in the following table and it will be noted that tests identified as 3A and 3B containing the solubilizers are quite superior in results.

| Days aged | Temperature (° F.) | Force measurement | | |
|---|---|---|---|---|
| | | 3 | 3A | 3B |
| 1 | 140 | 22.8 | 29.2 | 26.8 |
| 2 | 140 | 21.2 | 27.6 | 30.0 |
| 4 | 140 | 20.4 | 27.6 | 29.2 |
| 8 | 140 | 18.8 | 24.4 | 26.8 |
| 12 | 140 | 19.6 | 25.2 | 25.2 |

EXAMPLE 4

Example 2 was repeated but including as solubilizer in the impregnant of the base sheet 30 parts by weight based on 100 parts by weight, dry, of the styrene-butadiene, of a hydrogenated wood rosin having a softening point of about 75° C.

After seven days of aging at 73° F. the force measured was 33.3, and, after seven days at 140° F., the measurement was 27.2.

Repeated comparative tests have shown that agents which are compatible with the adhesive component of the adhesive composition and which tend to enter the adhesive from the styrene-butadiene impregnant upon aging are effective to aid the capability of the composite to retain its adhesive capacity. These solubilizing agents for the adhesive components particularly include the hydrogenated rosins, esters of hydrogenated rosins, and esters of rosin as well as terpene resins such as those soluble in mineral oil, and petroleum hydrocarbon resins soluble in aliphatic and aromatic hydrocarbons. In general, these solubilizers have tackifying properties and are known in the art as tackifiers, though they apparently impart no significant tack property to the styrene-butadiene nor do they enter the release coat.

The solubilizing agent, we have found, should be present to the extent of at least 15% based on the dry weight of the strengthening impregnant. Preferably, the solubilizing agent is present to the extent of 30 to 40; 60% appears to be a useful upper limit.

The strengthening impregnant itself need only be constituted by a styrene-butadiene and most suitably is a carboxy-modified or amide-modified polymer. Other polymers of a basically non-polar nature may be included in the strengthening impregnant but are not necessary; such include polybutadiene, natural rubber and polyisoprene. It is to be noted that the presence of significant quantities of basically polar polymers such as neoprene or a butadiene-acrylonitrile are not contemplated by or within the scope of the present invention. In fact, our researchers have shown that generally less of the styrene-butadiene saturant, particularly when modified to contain carboxyl or amide grouping, is required to achieve a given purpose than when the more polar impregnants are employed.

The strengthening impregnant is itself present in the base sheet in an amount sufficient to provide the characteristics required to achieve the specific purposes to which the adhesive product is directed. Thus, for some purposes less strength and less impregnant may be required than for other purposes. Commonly, the strengthening impregnant will be present to the extent of between about 35% and 100% based on the dry weight of the sheet which is impregnated; a preferred range for most purposes is 50% to 80%.

The applicable techniques of application of the impregnant and coatings are well known to the art. Generally, the selection of a particular mode of operation of coating, for example, will be selected based upon the characteristics of the composition. Since such vary widely and are taught in the United States Patents 3,066,043 and 3,026,217 noted above, no further detailed consideration or instruction is necessary to those skilled in the art and it will be understood that such conventional techniques are contemplated as suitable for practice of the invention. Similarly, conventional components such as anti-oxidants and curing agents where curing is desired are contemplated as useful but are not within the inventive concept.

It is apparent from the examples given that the invention is not basically chemical in nature but physical, and is characterized by the physical properties of the individual components coacting in combination to provide the assembly so that the styrene-butadiene may be successfully employed in pressure sensitive tape applications. Certain ingredients have been found most useful in particular combinations but new polymers for adhesive formulations and new resins capable of solubilizing such are constantly being developed and made commercially available, many of which without doubt will be found useful in accordance with this invention in resolving the problems associated with the styrene-butadienes as the only necessary strengthening impregnant of pressure sensitive products. Currently, solubilizing agents commercially available and which are suitable include Dresinol 205, a hydrogenated wood rosin marketed in the form of an aqueous dispersion by Hercules Powder Company, Wilmington, Del.; Piccopale A-55, a petroleum hydrocarbon resin and Piccolyte S-115, a terpene resin, both soluble in organic solvents such as mineral spirits or chlorinated hydrocarbons and marketed by Pennsylvania Industrial Chemical Corporation, Clairton, Pa.; and Pentalyn H and Polypale Ester 10, rosin esters also marketed by Hercules Powder Company, Wilmington, Del.

Analysis of aged composites has shown that the solubilizing agents do migrate from the styrene-butadiene to the adhesive coat and solubilize the adhesive component—usually a natural rubber. This is, of course, particularly apparent when the solubilizing agent differs chemically from the tackifier employed with the adhesive component. Physical analysis of the aged products indicates that the solubilizers do not significantly affect the strength of the base sheet, its flexibility, resistance to delamination or the like whether or not the styrene-butadiene be itself modified with carboxyl or amide groups such as to provide a slight polarity in the styrene-butadiene. The modified form, however, is generally somewhat superior in overall characteristics though the cooperative relationship with the solubilizer appears the same whether or not the styrene-butadiene is modified.

The base sheet itself is preferably of natural cellulosic fibers such as wood fiber, cotton, hemp or the like. It may, however, include synthetics such as nylon, rayon, or polyester fiber for specific applications of the pressure sensitive adhesive product.

It will be understood that this invention is susceptible to modification in order to adapt to different usages and conditions and, accordingly, it is desired to comprehend such modifications within the invention as may fall within the scope of the appended claims.

What is claimed is:

1. A pressure sensitive adhesive product having a pressure sensitive coat containing an adhesive component and a tackifier, and an impregnated fibrous base sheet supporting said adhehive coat on one face of the fibrous base sheet, said base sheet containing as the only necessary strengthening impregnant a styrene-butadiene polymer, said impregnant having intermixed therewith to the extent of between about 15% to 60% by weight based on the dry weight of the strengthening impregnant a solubilizing agent for the adhesive component of the adhesive coat and which solubilizing agent is capable of migration from the strengthenng impregnant to the adhesive coat, said solubilizing agent being selected from the group consisting of hydrogenated rosins, esters of rosin, esters of partially hydrogenated rosins, terpene resins and petroleum hydrocarbon resins.

2. A pressure sensitive adhesive product of claim 1 where the solubilizing agent is an ester of a partially hydrogenated rosin.

References Cited

UNITED STATES PATENTS

| 2,559,990 | 7/1951 | Oace et al. | 117—122 |
| 3,012,913 | 12/1961 | Collins | 117—161 X |
| 3,026,217 | 3/1962 | Hechtman et al. | 117—122 X |
| 3,055,496 | 9/1962 | Dunlap | 117—122 X |
| 3,066,043 | 11/1962 | Hechtman et al. | 117—68.5 |
| 3,067,057 | 12/1962 | Dabroski | 117—68.5 |
| 3,345,206 | 10/1967 | Korpman | 117—161 X |

WILLIAM D. MARTIN, Primary Examiner

B. PIANALTO, Assistant Examiner

U.S. Cl. X.R.

117—68.5, 155, 161